Patented May 19, 1925.

1,538,355

UNITED STATES PATENT OFFICE.

PIO ROSSI, OF BERNE, SWITZERLAND.

POWDER FOR THE AUTOGENOUS SOLDERING OR WELDING OF ALUMINUM.

No Drawing.      Application filed June 5, 1923. Serial No. 643,556.

*To all whom it may concern:*

Be it known that I, PIO ROSSI, a subject of the Kingdom of Italy, and residing at Berne, Switzerland, have invented a certain new and useful Powder for the Autogenous Soldering or Welding of Aluminum, of which the following is a specification.

My invention has for its object to provide a powder for the autogenous welding or soldering of aluminum, permitting welding, soldering and repairs of all kinds to be made.

It has already been proposed to employ mixtures of chlorides and fluorides for the soldering and welding of aluminum. It has been found, however, that joints made with these mixtures are very liable to corrode and have a very low resistance against mechanical stresses.

Now, I have found that against corrosion and mechanical stresses very strong joints are produced by the use of a soldering powder obtained by a mixture comprising a small amount of chloride of sodium and a large amount of chloride of potassium, to which mixture is added a mixture consisting of equal parts by weight of fluoride of aluminum and cryolite and representing at least 35% of the total mixture.

These ingredients are preferably employed in the following proportions, viz:

Chloride of sodium 100 parts by weight or 5%.

Chloride of potassium 1150 parts by weight of 57.5%.

Fluoride of aluminum 375 parts by weight or 18.75%.

Cryolite 375 parts by weight or 18.75%.

The mixture may be made as follows:—

First, the chlorides of sodium and potassium are worked up together, then the cryolite and fluoride of aluminum are added, and this mixture is worked up, until a homogeneous powder is obtained.

For using the powder it suffices to moisten it with a little alcohol and paint or daub it with a brush or otherwise on the parts which are to be soldered or welded together, by means of the blow-pipe for example, either directly or with the aid of a stick of aluminum.

I claim:

1. A powder for the autogenous soldering or welding of aluminum, comprising a mixture of a small amount of chloride of sodium and a large amount of chloride of potassium, and a fluoride mixture consisting of equal parts of fluoride of aluminum and cryolite and representing at least 35% of the total mixture.

2. A powder for the autogenous soldering or welding of aluminum formed of a mixture composed of the following ingredients in approximately the following proportions by weight, namely:—

| | Parts. |
|---|---|
| Chloride of sodium | 100 |
| Chloride of potassium | 1150 |
| Fluoride of aluminum | 375 |
| Cryolite | 375 |

In testimony whereof, I affix my signature in the presence of two witnesses.

PIO ROSSI.

Witnesses:
A. BASILLEUX,
R. HEINGARTNER.